L. E. WATERMAN.
CULTIVATOR.
APPLICATION FILED JULY 10, 1916.

1,249,569.

Patented Dec. 11, 1917.
3 SHEETS—SHEET 1.

Inventor:
Lewis E. Waterman
By Pond & Wilson
Attys.

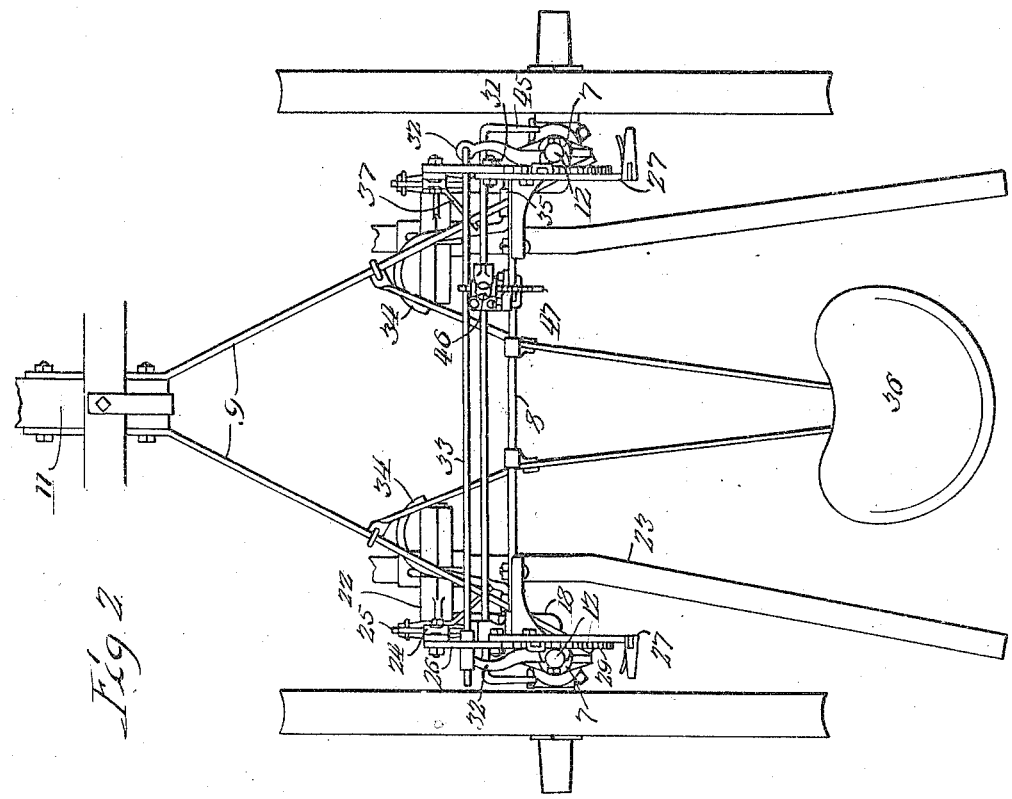

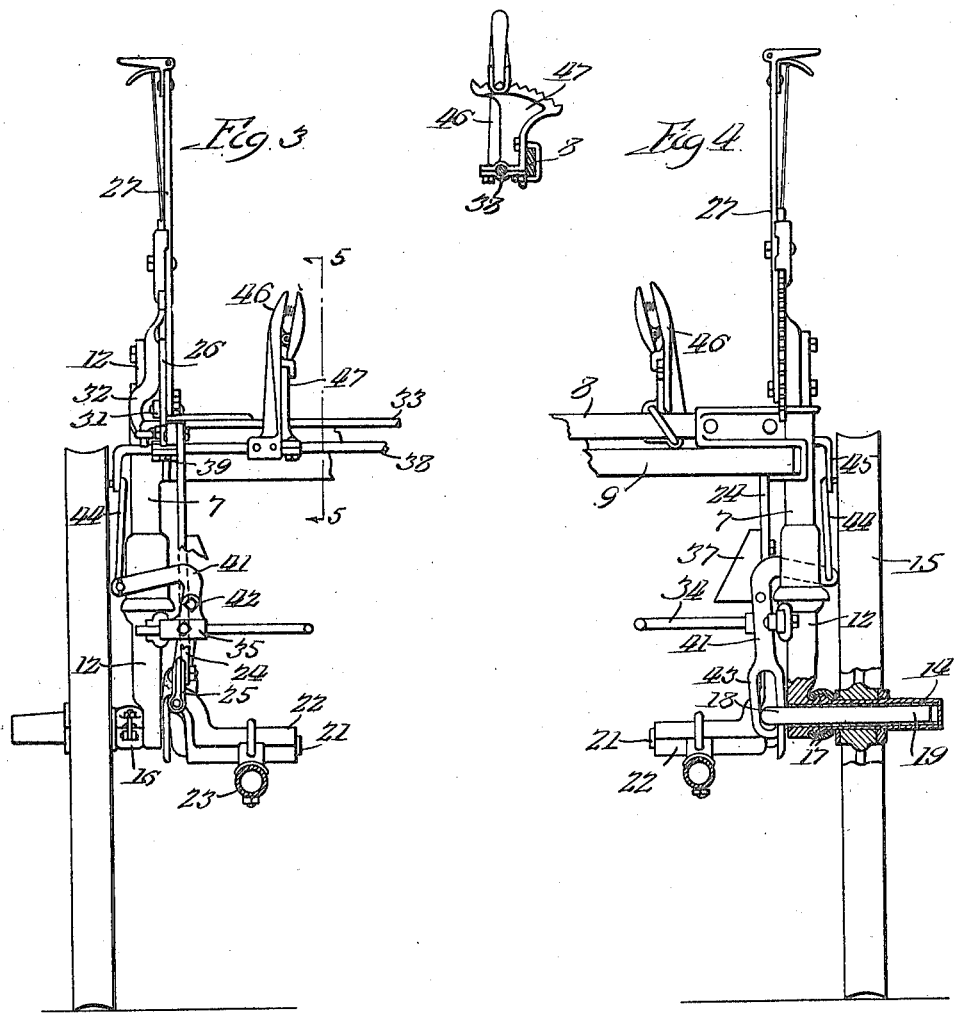

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

CULTIVATOR.

1,249,569.  Specification of Letters Patent.  Patented Dec. 11, 1917.

Application filed July 10, 1916. Serial No. 108,458.

*To all whom it may concern:*

Be it known that I, LEWIS E. WATERMAN, a citizen of the United States, residing at Rockford, in the county of Winnebago and State of Illinois, have invented certain new and useful Improvements in Cultivators, of which the following is a specification.

This invention relates in general to cultivators of the pivot or dirigible wheel type, and has more particular reference to the type described in my applications Ser. Nos. 654,401 and 862,789. These cultivators are characterized by the peculiar manner in which the cultivator beams and supporting wheels are mounted. An axle crank, that is, a crank pivotally mounted in the axle of one of the supporting wheels is movable with the wheel about an upright axis for steering purposes and carries at its inner end a cultivator beam which may be raised and lowered by rocking the axle crank on its mounting in the wheel and may be angled with respect to the line of draft in unison with the wheel by being swung about said upright axis. Furthermore, a parallelogram structure, two adjacent sides of which are formed by the axle crank and an upright pivot member about the longitudinal axis of which the structure swings, is provided for the purpose of raising and lowering the cultivator beam in a substantially parallel movement with the beam horizontally disposed. Cultivators of this type possess many desirable advantages as pointed out in my said applications.

A cultivator of the above character, due to the quick and easy manner in which it may be manipulated and controlled, is particularly well adapted for garden and truck cultivation, wherein the tracts of plants are comparatively small and the plants of a large variety are generally planted in rows arranged closely together. Since plants of different varieties are planted in differently spaced rows and also require varying degrees of cultivation, it is necessary to adjust the cultivator beams transversely on the axle crank supports to position the cultivating shovels in proper proximity to the plants. This necessitates adjustment of the bolted connections, or more particularly, loosening and tightening of the fixed connections between the cultivator beams and their supports so that the beams may be adjusted laterally thereupon and is objectionable because of the time and difficulty incident to making frequent adjustments.

The primary object of my invention is to provide novel means whereby the beams of a cultivator may be quickly and easily adjusted transversely to the line of draft to conveniently position the beams for cultivation in any desired proximity to the plants.

More specifically, my invention contemplates, in connection with a cultivator of the type described, the provision of means for adjusting the axle cranks lengthwise in their journals so that the cultivator beams mounted on the axle cranks will be adjusted transversely to the line of draft.

A further object of my invention is to provide an improved, simple and practical means for laterally adjusting the beams of a cultivator, which may be manufactured at a comparatively low cost.

Referring to the drawings,

Fig. 2 is a plan view of the cultivator;

Figs. 3 and 4 are front and rear views respectively, of one side of the cultivator, a portion of Fig. 4 being shown in section; and Fig. 5 is a detail sectional view taken on the line 5—5 of Fig. 3.

Figure 1:
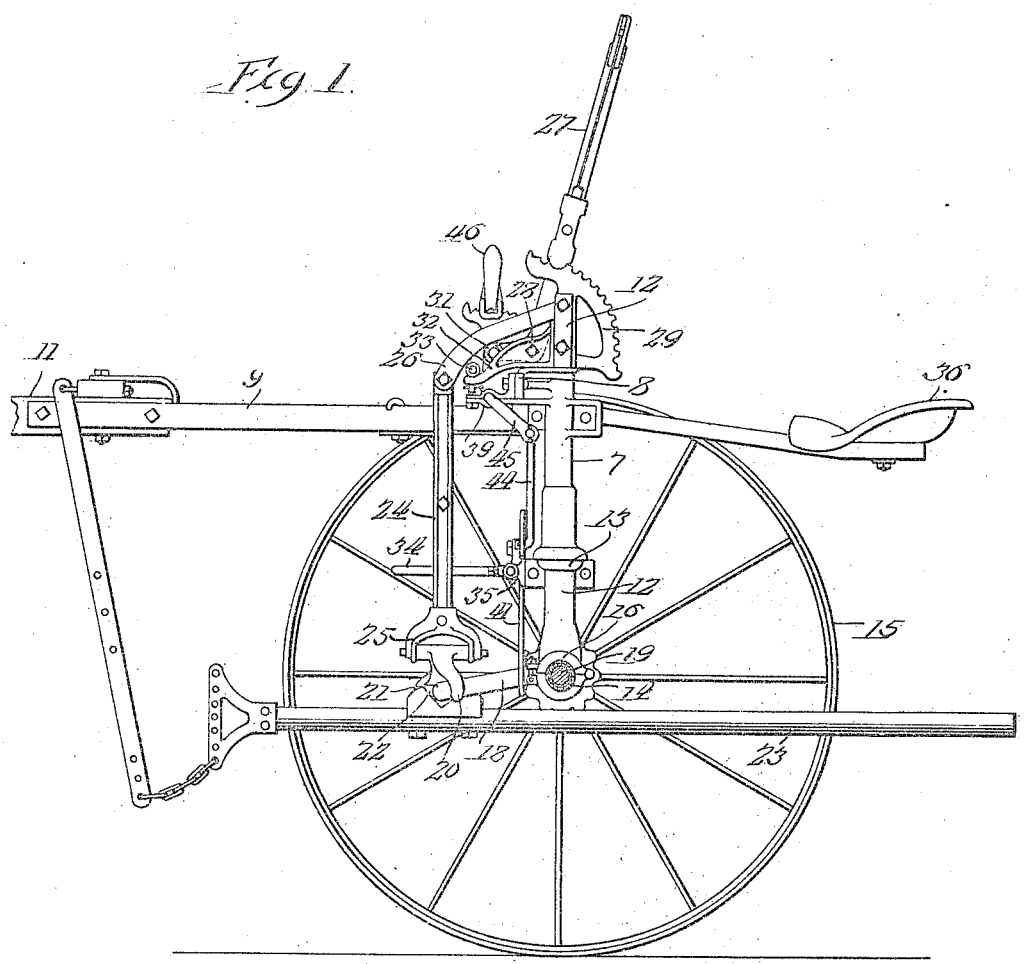
Figure 1 is a side view of a cultivator embodying my improvements, the near supporting wheel being removed.

The frame of a cultivator in which I have embodied my improvements comprises a pair of upright tubular standards 7 which serve as journal bearings, a cross bar 8 bolted at its ends to the standards 7 and forwardly converging hounds 9 bolted at their rear ends to the standards and at their front ends to a tongue 11. In each standard 7 is journaled a shaft or supporting member 12 that projects beyond both ends of said standard, the lower end of the supporting member being stepped on a suitable anti-friction roller bearing (not shown) inclosed in the bearing case 13.

The members 12 serve as supports to which the supporting wheels and cultivator beams are connected and whereby the same may be moved in unison with these members about their upright axes. To the lower end of each pivot support 12 is secured a tubular axle 14, best shown in Fig. 4, upon which is journaled a supporting wheel 15. A split coupling 16 secures each supporting wheel against displacement on its axle by engaging the adjacent annular beaded ends 17 of the wheel hub and the pivot support 12. An axle crank of general Z-shape designated generally by reference character 18 has one end 19 journaled in the sleeve axle 14 so as to be capable of rotatable and longitudinal movement therein. The axle crank extends forwardly from its pivoted end and carries, loosely journaled on its outer end 21, an exteriorly square sleeve 22 to which may be rigidly secured a cultivator beam 23, the sleeve being held against longitudinal movement on its pivot portion in one direction by abutment of its outer end against the axle crank and in the opposite direction by an integral finger 20 engaging the outer side of said axle. By swinging the axle crank on its pivot the cultivator beam may be raised and lowered.

The means employed for so moving the axle crank consists of an upright bar 24 pivotally connected at its lower end to the sleeve 22 through the intermediary of a yoke pivotal connection 25 which holds the bar 24 at substantially right angles to the beam 23 and permits the bar to move relatively to the beam in a direction transverse to the line of draft. A link 26 pivotally connecting the upper end of the bar 24 and the pivot support 12 maintains the said bar in upright position, and this link in turn is held against swinging downwardly on its pivot by means of a hand lever 27 pivotally mounted at 28 on a toothed segment bracket 29 bolted to the upper end of the pivot support 12. This lever is provided at its lower end with a forwardly extending arm equipped with a roller 31 engaging the underside of the links 26 and is provided also with the usual releasable latch adapted to engage the toothed face of the segment.

It will be observed that each cultivator beam, equipped with suitable cultivating shovels or devices (not shown) and connected at its forward end to suitable draft means, is supported by a palallelogram structure articulated at its corners. The upper and lower sides of each structure are formed by a link 26 and axle 18 respectively, and the front and rear sides are formed by a bar 24 and axle support 12 respectively. This structure and the parts connected thereto may be swung as a unit about the longitudinal axis of the pivot support 12 and by such movement the supporting wheel and cultivator beam, held in fixed relation are angled in unison to the line of draft. Also by adjusting the hand levers 27, the members 18, 24 and 26 of each parallelogram structure may be raised and lowered, thus raising and lowering the cultivator beams in a substantially parallel movement.

The pivot supports 12 are connected together so as to maintain the wheels in parallel relation, and consequently the wheels will be angled in unison. For this purpose the segment brackets 29 are provided with integral forwardly projecting arms 32 that are joined at their forward ends by a longitudinally adjustable tie rod 33. Foot stirrups 34 fixedly secured to brackets 35 that are in turn secured to the lower ends of the pivot supports 12 serve to enable an operator on the seat 36 to easily steer the cultivator. The supporting wheels are automatically locked against pivoting when the cultivator beams are raised. This is effected by means of the inwardly inclined projections 37 Fig. 4 secured to the bars 24. These projections are in vertical alinement with the hounds 9 so that upon upward movement of the bars the inclined faces of the projections will be moved into engagement with the outer sides of the hounds, thereby preventing lateral movement of the wheels relatively to the frame.

Means are provided for moving the axle cranks on their pivot portions longitudinally in their mountings to move the cultivator beam laterally, that is, transversely to the line of draft. This means consists of a transverse rock shaft 38 mounted in bearings 39 secured to the ends of the cross bar 8 of the frame, bell-cranks 41 pivoted at 42 to the brackets 35 and each having one of its ends 43 provided with an elongated opening through which the arm of the adjacent axle crank extends, the bell-cranks being connected at their opposite ends through the agency of links 44 to the down turned ends 45 of the rock shaft 38. By rocking the shaft 38, it will be apparent that the bell cranks 41 will be rocked so as to move the axle cranks lengthwise in the axle bearings. A hand lever 46 is employed for rocking the shaft 38, this lever being fixed to the shaft 38, coöperates through means of a conventional type of spring latch with a notched sector 47 which is fixedly secured to the cross bar 8 of the frame. It will be manifest that by adjusting the lever 46 to different set positions the cultivator beams may be adjusted toward and from each other and set in any adjusted position. In so adjusting the cultivator beams, it will be noted that the axle cranks move independently of and with respect to the pivot supports 12 and that the upright bars 24 move with the beams. Since the angular relation of the bars 24 and axle cranks is changed during such adjustment, relative movement between these parts is permitted by the pivotal joints 25.

During cultivation, the cultivator may be steered as described above by manipulation of the foot stirrups 34 to either side to dodge obstructions or to conform to irregularities in the rows of plants, and when it is desired to move the cultivating devices into and out of operative position or to adjust the working depth of the shovels the hand levers 27 may be accordingly manipulated. To quickly and easily set the cultivating devices for operation on rows of plants spaced apart different distances or to secure more or less close cultivation the hand lever 46 may be adjusted according to the circumstances.

It is believed that a clear understanding of my invention will be had from the foregoing, and it should be understood that while I have shown and described a single embodiment of the invention various modifications and changes in details of construction may be resorted to without departing from the spirit and scope of the invention or sacrificing any of its material advantages.

I claim:

1. In a cultivator, the combination of a frame, a pair of dirigible supporting wheels therefor, an axle crank pivotally mounted in the axle of each wheel and slidable axially longitudinally therein, a cultivator beam mounted on each crank so as to be raised and lowered by rocking the crank on its pivot, and means for moving said cranks axially longitudinally in their mounting to move the cultivator beams transversely to the line of draft.

2. In a cultivator, the combination of a frame, supporting wheels therefor, a crank mounted on each side of the frame on a horizontal axis transverse to the line of draft so as to be capable of pivotal and axial movement, a cultivator beam mounted on the free end of each crank so as to be raised and lowered by swinging the crank on its pivot, and means for moving the cranks longitudinally of their pivots whereby to move the cultivator beams transversely to the line of draft.

3. In a cultivator, the combination of an axle crank movable axially in its pivotal mounting, a cultivating device mounted on the free end of the axle crank, and means for moving the crank longitudinally of its pivot axis to adjust the cultivating device transversely to the line of draft to different operative positions.

4. In a cultivator, the combination of a frame, supporting wheels therefor, a crank mounted on the frame on a horizontal axis transverse to the line of draft so as to be movable longitudinally on its pivotal mounting, a cultivator beam mounted on the frame, and connections between the hand lever and crank for moving the same and the cultivator beam carried thereby transversely to the line of draft upon operation of the hand lever.

5. In a cultivator, the combination of a frame including an upright parallelogram structure articulated at its corners, having its lower end in the form of an axle crank movable longitudinally of its pivot axis and equipped at its outer end with a cultivating device, one upright side of the structure being adapted to pivot about its longitudinal axis so that the parallelogram structure may likewise pivot about this axis, the other side having a pivotal joint to permit of transverse movement of the axle crank with respect to the said jointed upright side, means for swinging the axle crank on its pivot to raise and lower the cultivating device, means for swinging the parallelogram structure on said upright axis to angle the wheels and cultivating device to the line of draft, and means for moving the axle crank longitudinally of its pivot axis to move the cultivating device transversely to the line of draft.

6. In a cultivator, the combination of a frame, a cultivating device mounted on each side of the frame and movable transversely with respect thereto, a transverse rock shaft mounted on the frame, an adjustable hand lever for rocking said shaft, and a connection between each end of the shaft and a cultivating device for moving the latter in unison toward and from each other upon adjustment of said hand lever.

7. In a cultivator, the combination of a frame, a cultivating device mounted on each side of the frame and movable transversely with respect thereto, a transverse rock shaft mounted on the frame, an adjustable hand lever for rocking said shaft, a connection between each end of the shaft and a cultivating device, including a bell crank arranged to move the cultivating devices toward and from each other in unison upon rocking movement of the shaft.

LEWIS E. WATERMAN.

Copies of this patent may be obtained for five cents each, by addressing the "Commissioner of Patents, Washington, D. C."